March 15, 1932. G. C. PASSEK 1,849,379
RADIO FINDER
Filed March 18, 1931 3 Sheets-Sheet 1
FIG. I.
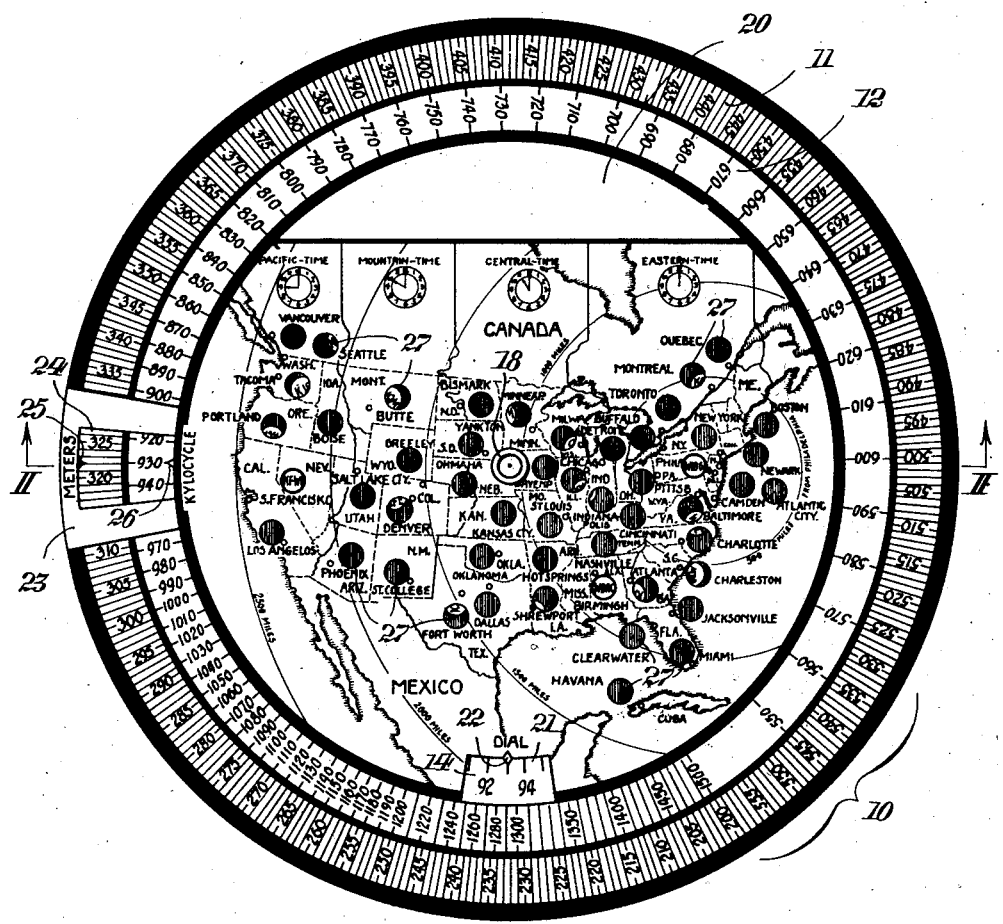
FIG. II.
WITNESSES
INVENTOR:
George C. Passek
BY
ATTORNEYS.

March 15, 1932. G. C. PASSEK 1,849,379
RADIO FINDER
Filed March 18, 1931 3 Sheets-Sheet 2
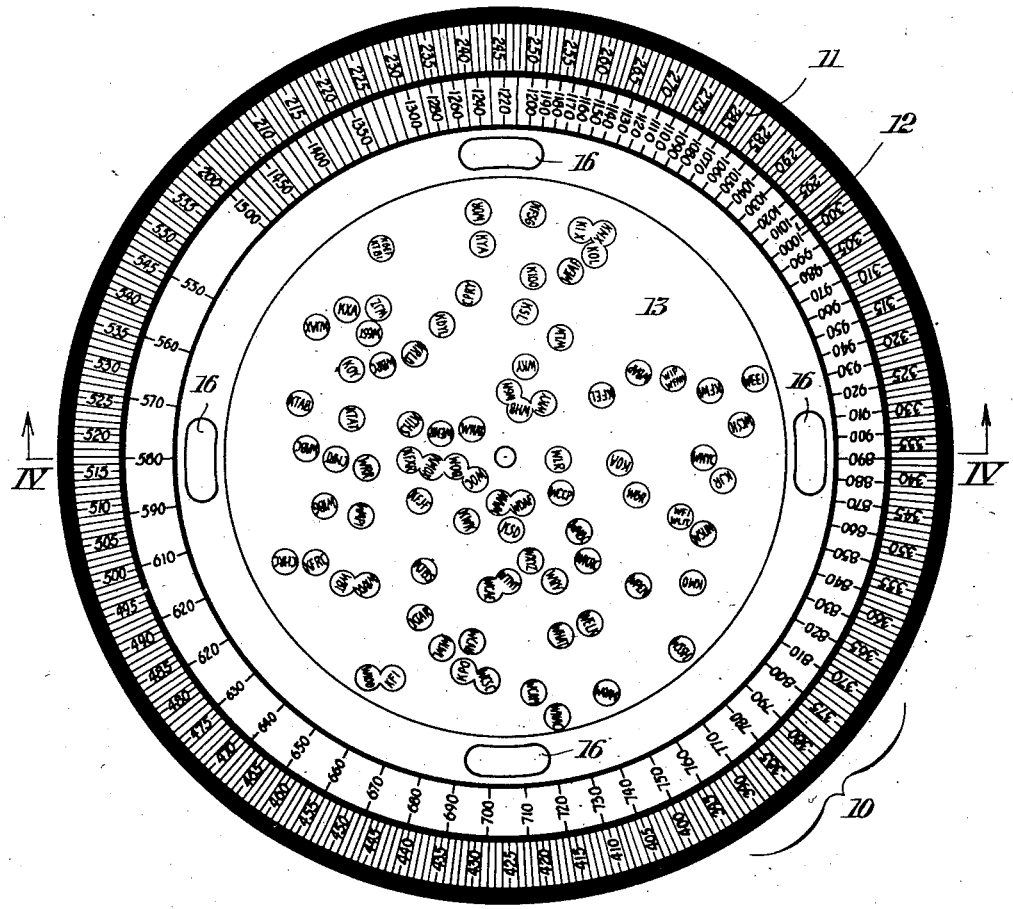
FIG. III.
FIG. IV.
WITNESSES
John E. Bergner
William Bell, Jr.
INVENTOR:
George C. Passek,
BY Fraley Paul
ATTORNEYS.

March 15, 1932. G. C. PASSEK 1,849,379
RADIO FINDER
Filed March 18, 1931   3 Sheets-Sheet 3
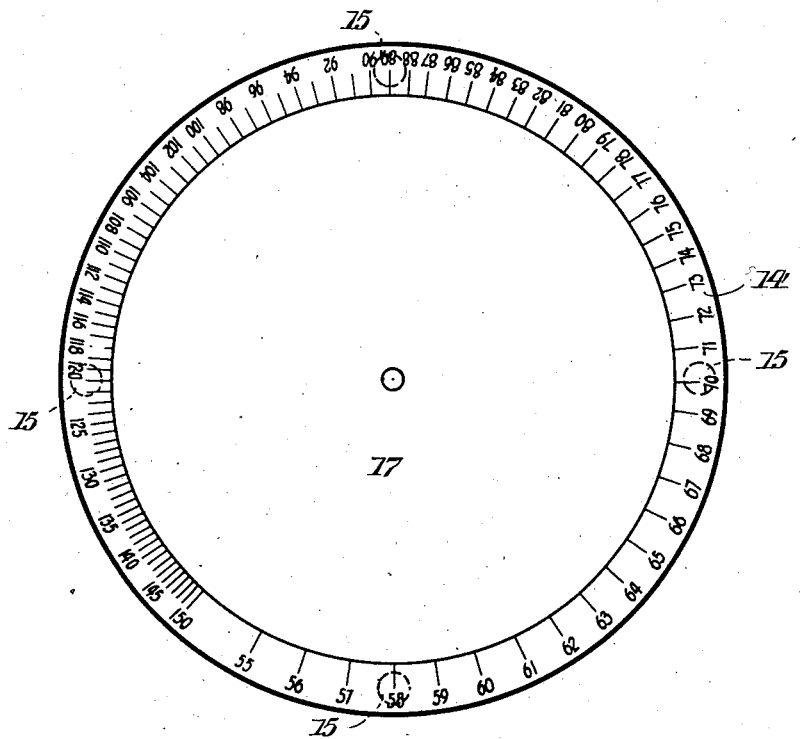
FIG. V
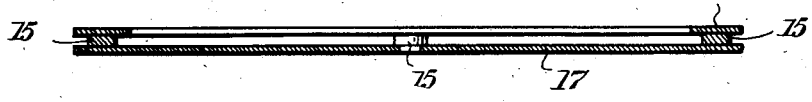
FIG. VI
WITNESSES
John C. Bergner
William Bee Jr.
INVENTOR:
George C. Passek
BY Fraley Paul
ATTORNEYS.

Patented Mar. 15, 1932

1,849,379

UNITED STATES PATENT OFFICE

GEORGE C. PASSEK, OF PHILADELPHIA, PENNSYLVANIA

RADIO FINDER

Application filed March 18, 1931. Serial No. 523,443.

This invention relates to finders useful in connection with radio receivers.

The chief aim of my invention is to dispense with the necessity for compiling and maintaining a radio "log" as a source of information in radio reception. This desideratum I attain as hereinafter fully disclosed, through provision of a dependable direct reading finder which is simple in construction and easy to operate, and which will visibly indicate not only the call letters of a broadcasting station for a given tuning dial setting of a radio receiver, but all other important data concerning such station, to wit: the location of the station on a map, and the wave length as well as the frequency under which such station is authorized to operate.

A further object of my invention is to make provisions in a radio finder having the above attributes, whereby adjustments may be effected to compensate for inaccuracies in the setting of the tuning dial of the particular radio receiver with which the finder is to be used.

Other important advantages inherent to my invention will be manifest from the detailed description which follows taken in connection with the attached drawings, wherein Fig. I is a face view of my improved radio finder.

Fig. II is a cross sectional view of the same taken as indicated by the arrows II—II in Fig. I.

Fig. III is a face view of the ground chart of my radio finder.

Fig. IV is a sectional view of the ground chart taken as indicated by the arrows IV—IV in Fig. III.

Fig. V is a face view of an adjustable circular scale associated with the ground chart of the finder; and, Fig. VI is an axial sectional view of the scale shown in Fig. V.

As herein illustrated, the radio finder of my invention comprises a circular ground chart 10 bearing two concentric circular scales 11, 12, see Figs. I and III, whereof the outer one is graduated and numbered for broadcasting wave lengths in meters, and the inner one graduated and numbered for broadcasting frequencies in kilocycles. The infield 13 of the ground chart 10, see Fig. III, has inscribed thereon at different allocations, the call letters of various broadcasting stations. Associated with the ground chart 10, is a scale ring 14, see Figs. II, V and VI, which is graduated to correspond with the tuning dial of a radio receiver, and maintained in concentric relation with the ground chart 10, inward of the scale 12, by an annular shoulder formed on said chart. The scale ring 14 thus has capacity for circumferential adjustment in respect to the other scales 11, 12 of the ground chart 10 to compensate for inaccuracies in the setting of the broadcast receiver dial. As shown in Figs. III and VI, the scale ring 14 is supported by studs 15 that reach upward through concentric slots 16 in the ground chart 10, from an underlying disk 17, and axially pivoted to said chart by a tubular rivet 18.

Mounted for concentric rotation about the rivet 18 above the ground chart 10 is a disk 20 which overlies the infield 13 of said ground chart, as well as the scale ring 14. However, at one point in its circumference, the disk 20 has a notch 21 through which a portion of the scale ring 14 is visible. Within the notch 21, the disk 20 is formed with a pointer index 22 for coordination with the graduations of the scale ring 14. At a point ninety degrees from the notch 21 around the disk 20 there is an actuating projection 23 which extends over the scales 11, 12 and which has an opening 24 wherethrough portions of the said scales are exposed, as well as pointer indices 25 and 26 for coordination respectively with the graduations of the said scales. From Fig. I it will be observed that the various broadcasting stations on the map are marked by apertures 27 cut through the disk 20.

The operation of the device is as follows: Let it be assumed that the receiving set in connection with which the device is being used, is in operation, and that its dial setting is "93". The disk 20 is accordingly turned about the stud 18 so that its index 22 points to the graduation midway between the numerals 92 and 94 on the adjustable ring scale 14 as in Fig. I. With the disk 20 in this position, the indices 25 and 26 show that the wave length and frequency of the station or station broadcasting at the time are respectively 322 and 930. Concurrently, the call letters WIBG, WBRC and KFWI are exposed through certain of the apertures 27 in the disk 20 to indicate that the broadcast is being received from one of these stations which, according to the map, are located respectively, in the States of Pennsylvania, Alabama and Nevada.

The device may also be used conversely. For example, let it be assumed that the broadcasting wave length, frequency, and dial setting for the station KWFI is required, then the disk 20 is turned until the above call letters appear through one of the openings 27 whereupon the indices will point to the scales 11, 12 and 14 respectively at the graduations 322, 930 and 93.

If desired, the different time zones may be indicated on the map, as well as circles marking distances from a given point on the map as shown in Fig. I.

Having thus described my invention, I claim:

1. A direct reading radio finder comprising a ground chart bearing a circular scale with graduations corresponding to the tuning dial of a radio receiver, and having inscribed thereon at different allocations, the call letters of various broadcasting stations; and a concentrically mounted disk rotatable on the chart, having an index for coordination with the scale aforesaid, and apertures therethrough, whereby when the disk is indexed with one of the graduations of the scale, the call letters of the corresponding stations on the ground chart are exposed to view through the apertures of the said disk.

2. A direct reading radio finder comprising a ground chart bearing a circular scale with graduations corresponding to the tuning dial of a radio receiver, and having inscribed thereon at different allocations, the call letters of various broadcasting stations, the said scale being circumferentially adjustable on the chart relative to the call letter inscriptions to enable compensation for inaccuracies in the setting of the receiver dial; and a concentrically mounted disk rotatable on the chart, having an index for coordination with the scale aforesaid, and apertures therethrough whereby when the disk is indexed with one of the graduations of the scale, the call letters of the corresponding stations on the ground chart are indicated through the apertures of said disk.

3. A direct reading radio finder comprising a ground chart bearing a scale with graduations corresponding to the tuning dial of a radio receiver, and having inscribed thereon at different allocations, the call letters of different broadcasting stations; and a map disk with apertures marking various broadcasting points as well as an index for coordination with the scale aforesaid, rotatable on the chart, whereby, when the said disk is indexed with one of the scale graduations, the call letters of the corresponding broadcasting stations are indicated through the proper designation apertures of the map.

4. A direct reading radio finder comprising a ground chart bearing three concentric circular scales, one graduated for wave lengths in meters, another graduated for frequencies in kilocycles and the third graduated to correspond with the tuning dial of a radio receiver, and having inscribed at different allocations on its infield, various station call letters; and a concentrically mounted disk rotatable on the ground chart, having indices for coodination respectively with all three of the scales aforesaid, as well as apertures, whereby when the disk is indexed with one of the graduations of the dial scale, the call letters on the ground chart of the corresponding broadcasting stations are indicated through the apertures of the disk and the wave length and frequency under which such stations operate, concurrently indicated on the wave length and frequency scales of the ground chart.

5. A direct reading radio finder comprising a ground chart bearing three concentric circular scales, one graduated for wave lengths in meters, another graduated for frequencies in kilocycles, and the third graduated to correspond with the tuning dial of a radio receiving set, and having inscribed on its infield, at different allocations, various station call letters; and a concentrically mounted map disk rotatable on the chart having indices for coordination respectively with all three of the scales aforementioned, as well as apertures marking various broadcasting points, whereby, when the disk is indexed with any one of the graduations of the dial scale, the call letters of the broadcasting stations are indicated through the proper apertures of the map, and the wave length and frequencies under which such stations operate, concurrently indicated on the wave length and frequency scales of the ground chart.

6. A direct reading radio finder comprising a ground chart bearing concentric circular scales, one graduated for wave lengths in meters the other graduated for frequencies in kilocycles; a movable scale ring graduated to correspond with the tuning dial of a radio receiver; and a concentric disk rotatable over the ground chart having indices for coordination respectively with all three of the scales, whereby when said disk is indexed with one of the graduations of the dial scale, the wave length and frequencies of the corresponding broadcasting stations are concurrently indicated on the wave length and frequency scales of the ground chart.

7. A direct reading radio finder comprising a ground chart bearing three concentric circular scales, one graduated for wave lengths in meters, another graduated for frequencies in kilocycles, and the third graduated to correspond with the tuning dial of a radio receiver, the last mentioned of the three scales being circumferentially adjustable relative to the other two to enable compensation for inaccuracies in the setting of the receiver dial; and a concentrically mounted disk rotatable on the ground chart, having indices for coordination respectively with the three scales, whereby, when the disk is indexed with one of the graduations of the dial scale, the wave length and the frequencies of the corresponding broadcasting stations are indicated respectively on the wave length and frequency scales of the ground chart.

In testimony whereof I have hereunto signed my name at Philadelphia, Pennsylvania, this 6th day of March, 1931.

GEORGE C. PASSEK.